US009697036B2

(12) United States Patent
Yun et al.

(10) Patent No.: US 9,697,036 B2
(45) Date of Patent: Jul. 4, 2017

(54) METHOD AND APPARATUS FOR GENERATING UNIQUE IDENTIFIER FOR DISTRIBUTED COMPUTING ENVIRONMENT

(71) Applicant: SAMSUNG SDS CO., LTD., Seoul (KR)

(72) Inventors: Ju Seok Yun, Seoul (KR); Young Gi Kim, Seoul (KR); Jae Hong Kim, Seoul (KR); Han Hwee Jo, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 15/148,011

(22) Filed: May 6, 2016

(65) Prior Publication Data

US 2016/0335112 A1 Nov. 17, 2016

(30) Foreign Application Priority Data

May 11, 2015 (KR) ........................ 10-2015-0065276

(51) Int. Cl.
*G06F 9/455* (2006.01)
*G06F 9/50* (2006.01)

(52) U.S. Cl.
CPC ........ *G06F 9/45558* (2013.01); *G06F 9/5077* (2013.01); *G06F 2009/4557* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

2013/0340077 A1* 12/2013 Salsamendi ......... G06F 9/45558
726/23
2015/0106805 A1* 4/2015 Melander ............ G06F 9/45537
718/1
2016/0210164 A1* 7/2016 Kruglick ............. G06F 9/45558

FOREIGN PATENT DOCUMENTS

KR 1020120052769 A 5/2012

OTHER PUBLICATIONS

ID Generation (http://www.slideshare.net/davegardnerisme/uniqueid-generation-in-distributed-systems), Aug. 2, 2012, Total 31 pages.

* cited by examiner

*Primary Examiner* — Dong Kim
(74) *Attorney, Agent, or Firm* — Sughrue Mion, PLLC

(57) ABSTRACT

Methods for generating a unique identifier of a distributed computing system are provided, one of methods comprise, receiving, by the first virtual machine, a first index range allocated by the identifier allocation server, receiving, by the second virtual machine, a second index range allocated by the identifier allocation server, the second index range being different from the first index range, generating, by the first virtual machine, a first unique identifier using an index in the first index range without intervention of the identifier allocation server and generating, by the second virtual machine, a second unique identifier using an index in the second index range without intervention of the identifier allocation server, wherein the first unique identifier and the second unique identifier are identifiers satisfying uniqueness for the whole distributed computing system.

11 Claims, 10 Drawing Sheets

METHOD AND APPARATUS FOR GENERATING UNIQUE IDENTIFIER FOR DISTRIBUTED COMPUTING ENVIRONMENT

CROSS-REFERENCE TO RELATED APPLICATION

This application claims priority from Korean Patent Application No. 10-2015-0065276 filed on May 11, 2015 in the Korean Intellectual Property Office, and all the benefits accruing therefrom under 35 U.S.C. 119, the contents of which in its entirety are herein incorporated by reference.

BACKGROUND

1. Technical Field

The present invention relates to a method and apparatus for generating a unique identifier (UID) required for performing an operation of a virtual machine (VM) in a distributed computing environment.

2. Description of the Related Art

A distributed computing environment has been developed to process an operation, which is difficult to be processed by one computing device, using a plurality of computing devices connected to the network. In the distributed computing environment, an instance to be performed in each virtual machine should allocate a unique identifier (UID) to each object in order to distinguish objects required for the operation.

As a method for allocating a unique identifier to each of many objects used in many instances performed in many virtual machines, there is a method using a universally unique identifier (UUID) or a globally unique identifier (GUID). However, in the method using the universally unique identifier (UUID) or the globally unique identifier (GUID), the number of values that can be generated using a random number is very large, but the same unique identifier may be generated repeatedly. Further, in a method in which a single central server generates a unique identifier and provides the unique identifier to each instance, a bottle-neck may occur when the single central server processes allocation requests of all unique identifiers.

SUMMARY

The present invention provides a method and apparatus capable of generating a unique identifier autonomously in each of virtual machines constituting the distributed computing environment.

However, aspects of the present invention are not restricted to one set forth herein. The above and other aspects of the present invention will become more apparent to one of ordinary skill in the art to which the present invention pertains by referencing the detailed description of the present invention given below.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EMBODIMENTS

Figure 1:
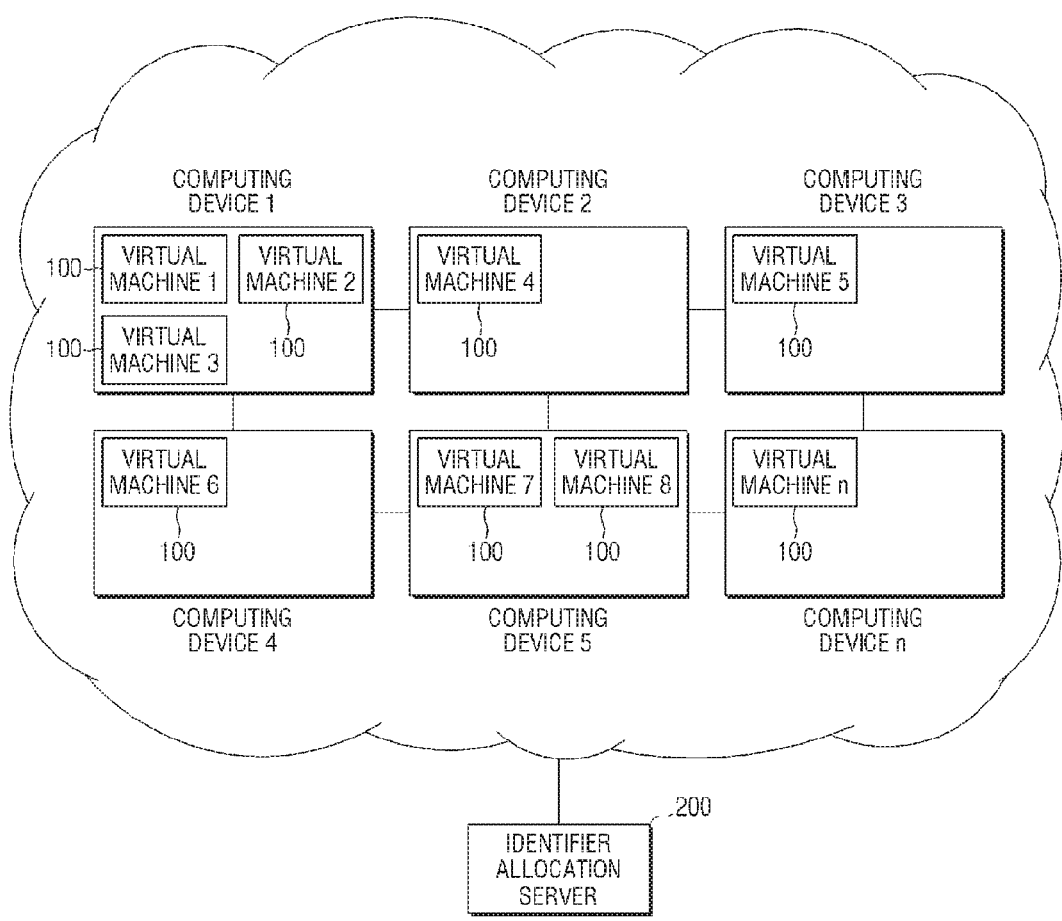
FIG. 1 is a block diagram of a distributed computing system according to an embodiment of the present invention.

The term "distributed computing environment" is a model for processing a complicated operation, which is difficult to be processed by one computing device, by using the computing power of a plurality of computing devices connected to the network. In the distributed computing environment, a plurality of computing devices connected to the network process the operation as if they are one computing device. The distributed computing environment may be expressed in the form such that a plurality of computing devices are included in a cloud.

The term "virtual machine (VM)" is an emulator for performing an operation through the respective computing devices that constitute the distributed computing environment. The virtual machine may be virtualized through a hypervisor. The hypervisor is a platform which allocates the resources of the computing devices and other resources to the virtual machine and provides an interface for management and monitoring tools. Therefore, the virtual machine may perform an operation independently of hardware or a manufacturer of the computing devices.

The term "instance" is the entity to be loaded in the memory of a computing device to perform an operation via the virtual machine. At least one instance is may be loaded in the memory of a computing device by a virtual machine (VM) to perform an operation. For example, the instance may include a process, a thread, a function, a structure, an array, a list, a stack, a queue, a tree, a graph or a class loaded in the memory of the computing device, but it is not limited thereto.

The term "object" is an object on which an operation is performed by the virtual machine. The object may include a command and data for performing an operation. One or more objects may be created by an instance and used in the calculation. For example, the object may include a process, a thread, a class, an element constituting a user interface such as a frame, an image, a string, a button, a dialog box, a check box, a radio button, or a system menu, but is not limited thereto, and may include an input device, an output device or an auxiliary storage device connected to the computing device.

The term "unique identifier (UID)" is an identifier allocated to the object required for the instance to perform the operation. That is, the unique identifier is an identifier allocated to each object in order to distinguish one or more objects from each other.

In particular, all the objects used by all the instances for all the virtual machines constituting the distributed computing environment according to an embodiment of the present invention have different unique identifiers. In other words, two unique identifiers allocated to two certain objects present in the distributed computing environment are not equal to each other, and the uniqueness of the unique identifier allocated to each object for the entire distributed computing environment is guaranteed.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 2:
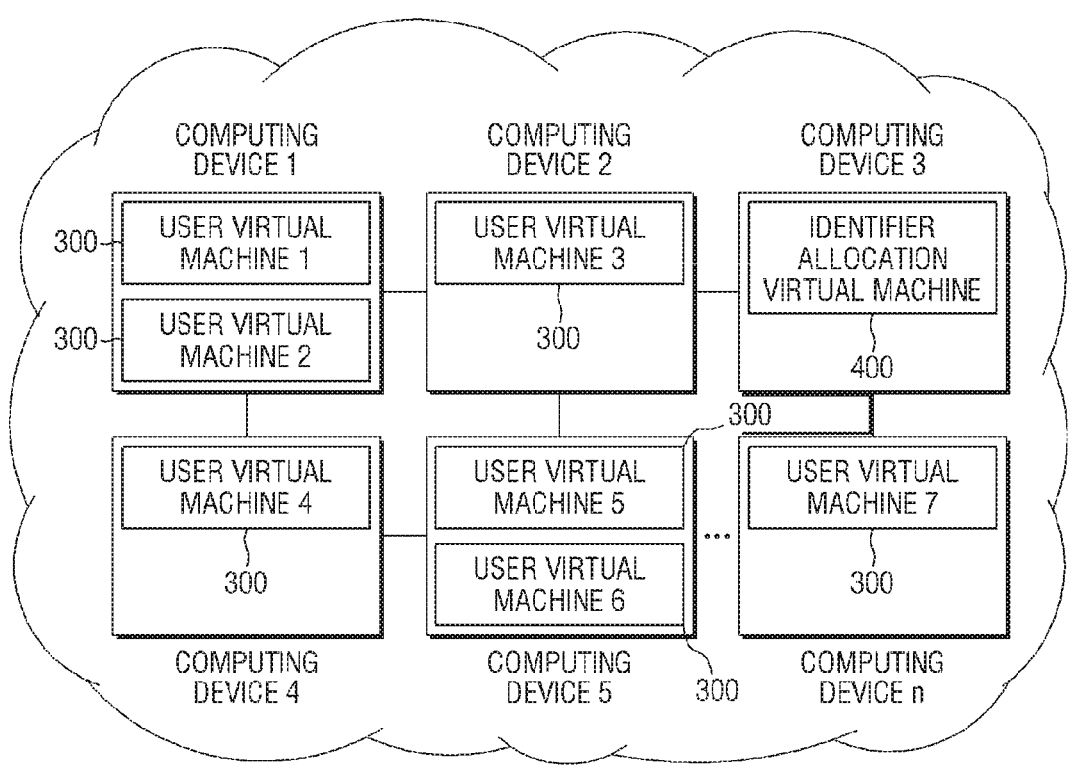
FIG. 2 is a block diagram of a distributed computing system according to another embodiment of the present invention.

FIGS. 1 and 2 are block diagrams of a distributed computing system according to some embodiments of the present invention. The distributed computing system shown in FIGS. 1 and 2 is a system in which a unique identifier can be generated autonomously by each virtual machine 100 or a user virtual machine 300 operating in each of the computing devices constituting the distributed computing environment. The respective components of the distributed computing system are functional elements which are distinguished functionally, and one or more components may be implemented to be integrated with each other in an actual physical environment.

Referring to FIG. 1, the computing device is a physical device capable of implementing one or more virtual machine 100 through a hypervisor, as one of the devices constituting the distributed computing system. The computing device may be any device which is capable of implementing the virtual machine 100 through a hypervisor and can transmit/receive data to/from an identifier allocation server 200. For example, the computing device according to an embodiment of the present invention may be a stationary computing device such as a desktop, a workstation and a server, or a mobile computing device such as a laptop, a tablet and a phablet, but the present invention is not limited thereto.

The virtual machine 100 may generate a unique identifier by using an index in a pre-allocated index range without intervention of the identifier allocation server 200, if the instance requests the allocation of the unique identifier, and provide the generated unique identifier to the instance.

The index range is a range of indexes that can be used when the virtual machine 100 generates the unique identifier. All virtual machines 100 present in the distributed computing system according to an embodiment of the present invention may generate unique identifiers by using different values in the index range. Further, the index range cannot be determined autonomously by each virtual machine 100, and can be allocated by the identifier allocation server 200. Further, the index range may have a fixed size, but it is not limited thereto and may be changed as needed. For example, the index range may be a range from 0 to 999, which includes 1000 values, but it is not limited thereto.

The identifier allocation server 200 may allocate a new index range in response to a request for allocating the index range from each virtual machine 100 present in the distributed computing system, and provide the allocated index range to the virtual machine 100. The identifier allocation server 200 may manage the index range by using a database such that one or more index ranges allocated to one or more virtual machines 100 do not overlap each other. For example, the identifier allocation server 200 may manage the index range by using Redis that can process the data based on in-memory technology. However, it is not limited thereto, and the index range may be managed by using MySQL.

Referring to FIG. 2, the computing device is a physical device capable of operating one or more user virtual machines 300 and an identifier allocation virtual machine 400 through a hypervisor, as one of the devices constituting the distributed computing system.

Since the user virtual machine 300 performs the same function as the above-described virtual machine 100, a redundant description thereof will be omitted.

The identifier allocation virtual machine 400 may allocate a new index range in response to a request for allocating the index range from each virtual machine 100 present in the distributed computing system, and provide the allocated index range to the user virtual machine 300. That is, the identifier allocation virtual machine 400 is the virtual machine 100 for performing a function of the identifier allocation server 200.

Since the description of the user virtual machine 300 and the identifier allocation virtual machine 400 is similar to the description of the virtual machine 100 and the identifier allocation server 200, the following description will be made in conjunction with the virtual machine 100 and the identifier allocation server 200.

Figure 3:
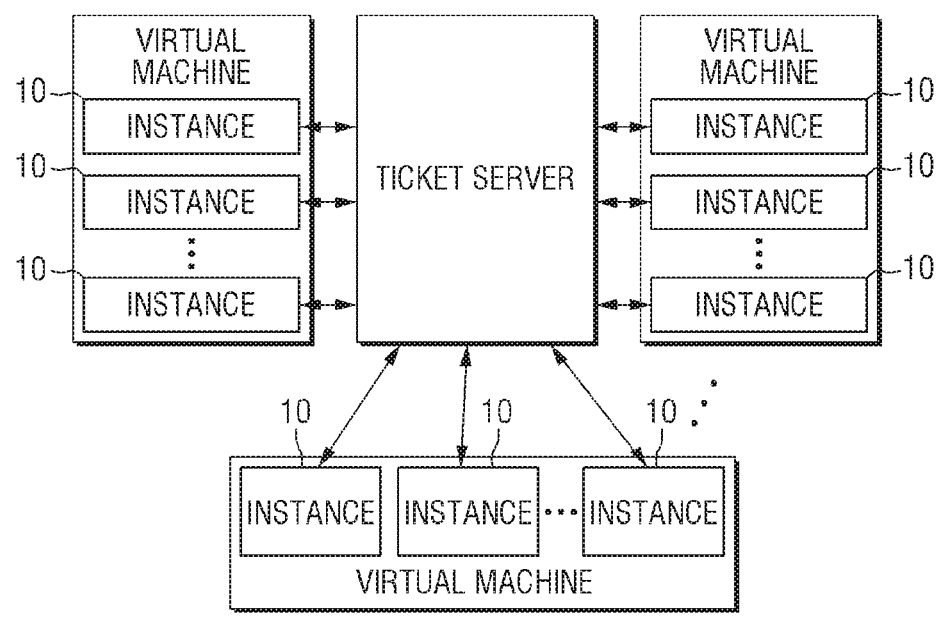
FIG. 3 is a conceptual diagram illustrating a method for generating a unique identifier in a conventional distributed computing system.
Figure 4:
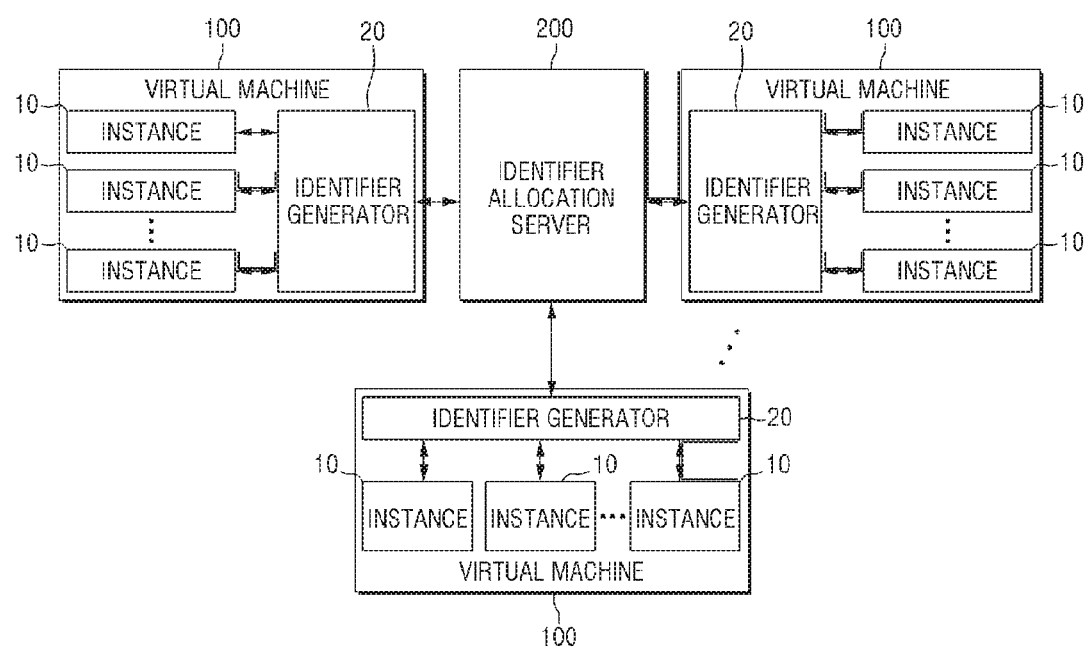
FIG. 4 is a conceptual diagram illustrating a method for generating a unique identifier according to an embodiment of the present invention.

Hereinafter, a conventional method for generating a unique identifier and a method for generating a unique identifier according to an embodiment of the present invention will be compared with reference to FIGS. 3 and 4. FIG. 3 is a conceptual diagram illustrating a method for generating a unique identifier in a conventional distributed computing system. FIG. 4 is a conceptual diagram illustrating a method for generating a unique identifier according to an embodiment of the present invention.

Referring to FIG. 3, each of instances of a plurality of virtual machines that exist in the conventional distributed computing system transmits a request for allocating a unique identifier to a single ticket server in order to assign a unique identifier to the object.

Upon receiving a request for allocating a unique identifier, a ticket server sets a lock in a database in response to exclusively access the database. The ticket server allocates a new unique identifier using the database. The ticket server releases a lock set in the database. The ticket server transmits the allocated new unique identifier to the instance. Then, the ticket server repeatedly performs the above-mentioned process in order to process the next request for allocating a unique identifier.

Thus, in the conventional distributed computing environment, since one ticket server processes numerous requests for allocating a unique identifier for numerous instances, a bottle-neck may be generated when allocating a unique identifier to the object.

However, referring to FIG. 4, in the method for generating a unique identifier according to an embodiment of the present invention, an identifier generator 20 provided in each virtual machine 100 generates a unique identifier in the index range allocated by the identifier allocation server 200 and provides the unique identifier to an instance 10.

Therefore, in the method for generating a unique identifier according to an embodiment of the present invention, since the identifier allocation server 200 processes only the allocation request of the index range and each virtual machine autonomously generates a unique identifier, a unique identifier can be allocated faster to the object.

Figure 5:
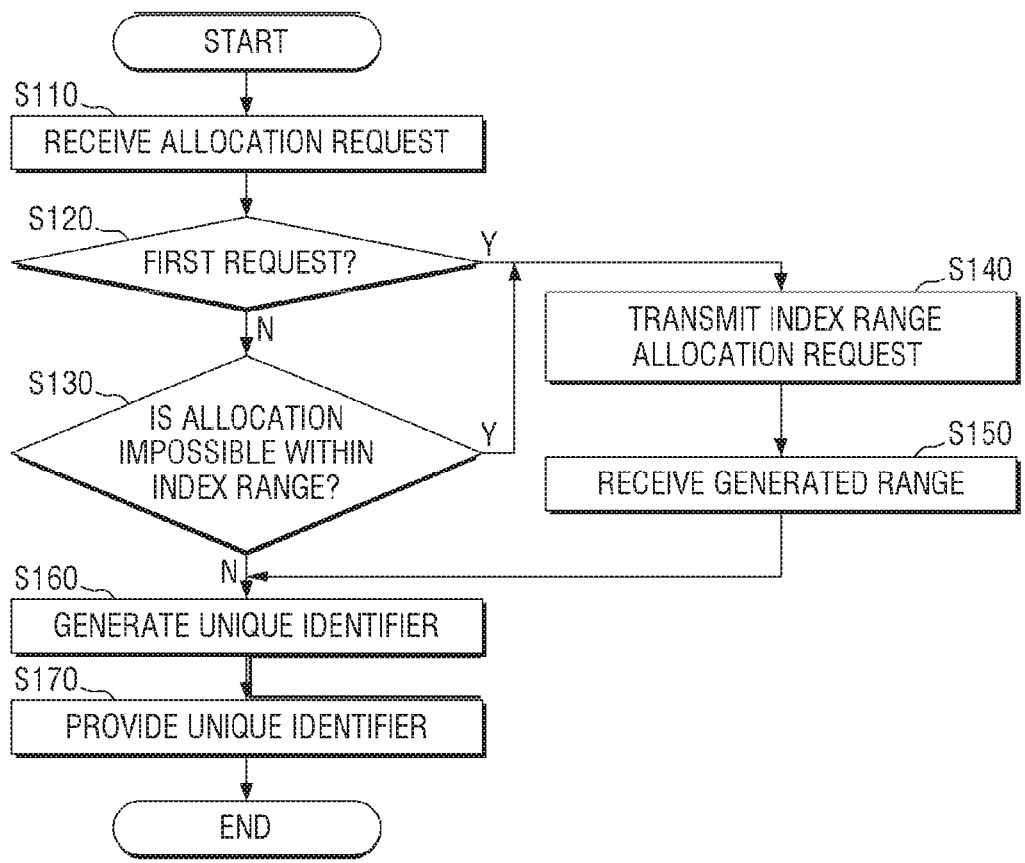
FIG. 5 is a flowchart illustrating a method for generating a unique identifier of a virtual machine according to an embodiment of the present invention.

The method for generating a unique identifier of the virtual machine 100 according to an embodiment of the present invention will be described in more detail with reference to FIGS. 5 and 6. FIG. 5 is a flowchart illustrating a method for generating a unique identifier of the virtual machine 100 according to an embodiment of the present invention.

Referring to FIG. 5, the virtual machine 100 receives a unique identifier allocation request from the instance (S110).

The virtual machine 100 determines whether the unique identifier allocation request received from the instance is a first request (S120). If it is determined that the unique identifier allocation request is not a first request, the virtual machine 100 determines whether a unique identifier can be generated in the index range allocated previously by the identifier allocation server 200 (S130).

If it is determined that the unique identifier allocation request is a first request, or a unique identifier cannot be generated in the previously allocated index range, the virtual machine 100 transmits an allocation request for a new index range to the identifier allocation server 200 (S140). Then, the virtual machine 100 receives a new index range (S150).

The size of the index range received by the virtual machine 100 according to an embodiment of the present invention may be a fixed size, but it is not limited thereto, and may be changed variably.

More specifically, when transmitting the allocation request for a new index range, the virtual machine 100 may also transmit a desired size for a new index range.

At this time, the desired size may be determined on the basis of the time taken until a unique identifier can no longer be generated by using the allocated index range after the index range is allocated by the identifier allocation server 200. For example, if the time taken until a unique identifier can no longer be generated by using the pre-allocated index range after the index range is allocated by the identifier allocation server 200 is equal to or less than the preset time, the desired size may be determined to be relatively large. In addition, if the time taken until a unique identifier can no longer be generated by using the pre-allocated index range after the index range is allocated by the identifier allocation server 200 is greater than the preset time, the desired size may be determined to be relatively small.

Further, the desired size may be determined based on the time interval at which the previous unique identifier is generated. That is, the desired size may be determined based on the time interval of the unique identifier allocation request received from the instance. For example, the virtual machine 100 may determine the desired size to be relatively large if the time interval of the unique identifier allocation request received from the instance becomes shorter. Further, the virtual machine 100 may determine the desired size to be relatively small if the time interval of the unique identifier allocation request received from the instance becomes longer.

Further, when receiving a new index range, the virtual machine 100 may also receive a size for the new index range. At this time, the size for the new index range may be determined by the identifier allocation server 200 based on the previous time interval at which the index range is allocated for the virtual machine.

The virtual machine 100 generates the unique identifier using the index in the index range allocated by the identifier allocation server without intervention of the identifier allocation server 200 (S160).

More specifically, the virtual machine 100 may generate a unique identifier by increasing the index included in the index range by one and combining the index with a time stamp. In this case, the time stamp is a series of strings indicating a time when the allocation of the unique identifier was requested from the instance. The time stamp may have a format such as Coordinated Universal Time (UTC), but is not limited thereto. Further, the time stamp may be expressed as milliseconds, but is not limited thereto. For example, if a time when the allocation of the unique identifier was requested from the instance is "Nov. 4, 2014, 08:42:19.825 PM," the time stamp may be represented as a string such as "1415101339825," but is not limited thereto.

Accordingly, in the method for generating a unique identifier according to an embodiment of the present invention, by using the time stamp together when generating the unique identifier, the virtual machine 100 may generate unique identifiers corresponding to the size of the index range per unit time of the time stamp. Thus, the size of the index range is the total number of unique identifiers that can be generated by the virtual machine 100 per unit time, rather than the total number of unique identifiers that can be generated by the virtual machine 100.

For example, if the unit of the time stamp is "millisecond" and the size of the index range is "1000," the virtual machine 100 may generate 1000 unique identifiers within one millisecond. Further, if the virtual machine 100 must generate 1001 or more unique identifiers within one millisecond, the virtual machine 100 transmits an allocation request for a new index range to the identifier allocation server 200.

Then, the virtual machine 100 provides the generated unique identifier to the instance which has requested the allocation of the unique identifier (S170).

Figure 6:
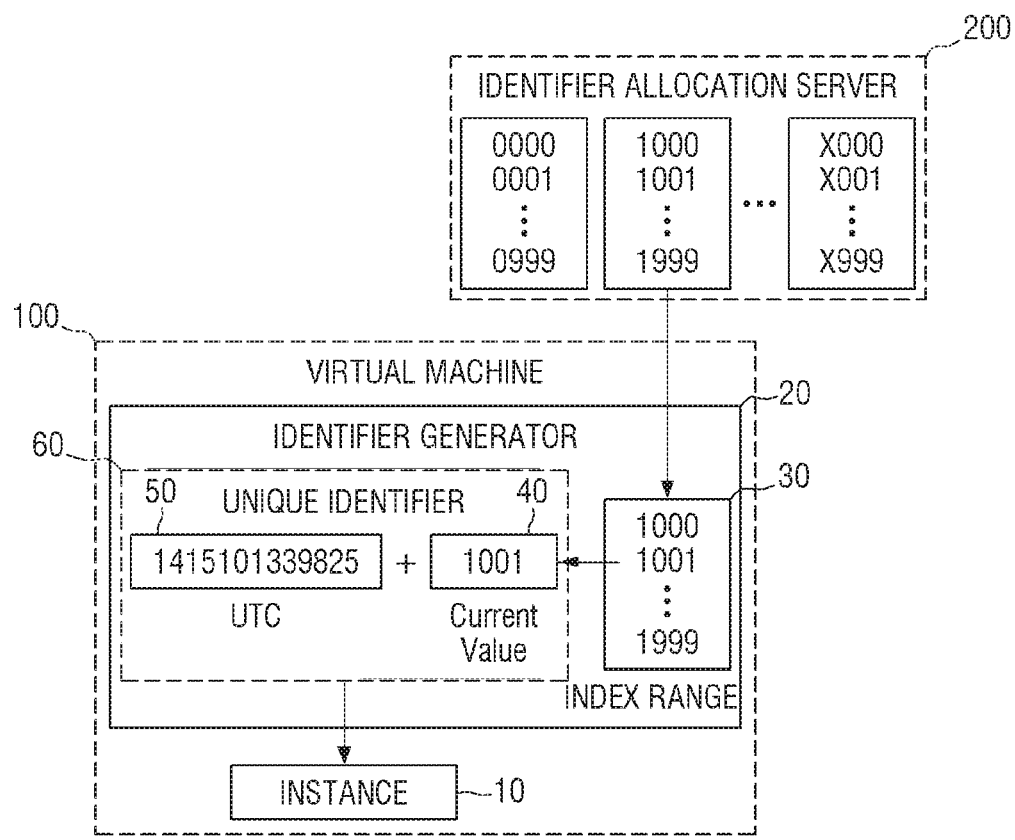
FIG. 6 is an exemplary diagram for explaining a unique identifier according to an embodiment of the present invention.

FIG. 6 is an exemplary diagram for explaining a unique identifier according to an embodiment of the present invention. Prior to the description of FIG. 5, it is assumed that the instance 10 which performs an operation through the virtual machine 100 has sent a unique identifier allocation request to the identifier generator 20 on "Nov. 4, 2014, 08:42:19.825 PM," and the identifier generator 20 of the virtual machine 100 has received an index range 30 including indexes between "1000" and "1999" allocated from the identifier allocation server 200.

Referring to FIG. 6, the identifier generator 20 of the virtual machine 100 generates a unique identifier 60 by combining a current value 40 "1001" obtained by increasing the index in the index range by one with a time stamp "1415101339825" obtained by expressing "Nov. 4, 2014, 08:42:19.825 PM" as milliseconds in Coordinated Universal Time (UTC). Further, the identifier generator 20 of the virtual machine 100 provides the generated unique identifier to the instance 10.

Figure 7:
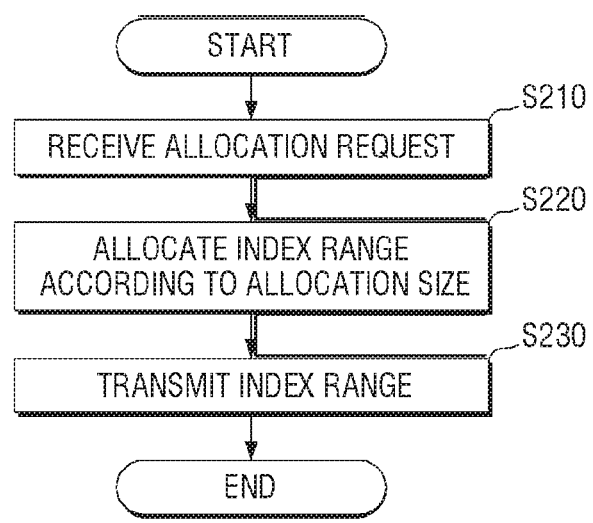
FIG. 7 is a flowchart illustrating a method for generating a unique identifier of an identifier allocation server according to an embodiment of the present invention.

Hereinafter, a method for generating a unique identifier of the identifier allocation server 200 according to an embodiment of the present invention will be described in more detail with reference to FIG. 7. FIG. 7 is a flowchart illustrating a method for generating a unique identifier of the identifier allocation server 200 according to an embodiment of the present invention.

Referring to FIG. 7, the identifier allocation server 200 receives an allocation request for the index range from the virtual machine 100 (S210).

The identifier allocation server 200 allocates the index range according to the allocation size (S220).

The allocation size of the index range that can be allocated by the identifier allocation server 200 according to an embodiment of the present invention may be a fixed size, but is not limited thereto, and may be changed as needed.

More specifically, the identifier allocation server 200 may allocate the index range according to the allocation size of a fixed size. For example, the identifier allocation server 200 may allocate the index range having a fixed size of four digits.

Further, when receiving an allocation request for the index range, the identifier allocation server 200 may also receive a desired size for the index range. Further, the identifier allocation server 200 may allocate the index range according to the received desired size instead of the fixed allocation size.

Also, the identifier allocation server 200 may adjust the allocation size based on the time interval of the allocation request for the index range received from the virtual machine 100. For example, the identifier allocation server 200 may record an accumulated history of the allocation request of the index range for each virtual machine 100. Then, the identifier allocation server 200 may adjust the allocation size to be relatively large if the time interval of the allocation request for the index range received from the virtual machine 100 becomes shorter, based on the accumulated history. Further, the identifier allocation server 200 may adjust the allocation size to be relatively small if the time interval of the allocation request for the index range received from the virtual machine 100 becomes longer, based on the accumulated history.

Then, the identifier allocation server 200 transmits the allocated index range to the virtual machine 100 (S230). At this time, when the allocation size of the index range transmitted to the virtual machine 100 is variable, the identifier allocation server 200 may also transmit the allocation size for the allocated index range.

The methods according to the embodiments of the present invention described with reference to FIGS. 5 to 7 may be performed by execution of a computer program implemented as computer readable codes. The computer program may be transmitted from a first computing device to a second computing device via a network such as the Internet, installed on the second computing device and used in the second computing device. Here, the first computing device and the second computing device include a stationary computing device such as a server, a workstation or a desktop, a mobile computing device such as a smart phone, a tablet, a phablet or a laptop, and a wearable computing device such as a smart watch, smart glasses or a smart band.

Hereinafter, a logical configuration of the virtual machine 100 and the identifier allocation server 200 according to an embodiment of the present invention will be described in more detail with reference to FIGS. 8 to 10.

Figure 8:
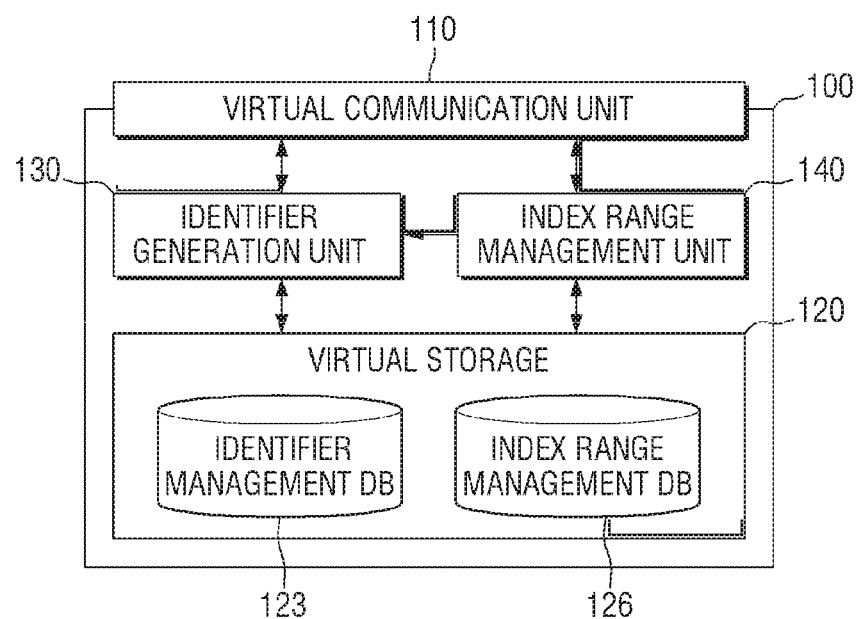
FIG. 8 is a block diagram of a virtual machine according to an embodiment of the present invention.

FIG. 8 is a block diagram of the virtual machine 100 according to an embodiment of the present invention. Referring to FIG. 7, the virtual machine 100 may include a virtual communication unit 110, a virtual storage unit 120, an identifier generation unit 130 and an index range management unit 140.

Each component will be described in detail. The virtual communication unit 110 may transmit/receive data to/from the identifier allocation server 200 via a network. Specifically, the virtual communication unit 110 may transmit an allocation request for the index range to the identifier allocation server 200 via the network. Then, the virtual communication unit 110 may receive a new index range from the identifier allocation server 200 via the network.

The virtual storage unit 120 stores data required for the operation of the virtual machine 100. Specifically, the virtual storage unit 120 may include an identifier management DB 123 and an index range management DB 126. The virtual storage unit 120 may include a storage such as Relational DataBase (RDB), Not Only SQL (NoSQL) or In-Memory Data Grid (IMDG) in order to manage the identifier management DB 123 and the index range management DB 126, but is not limited thereto.

A unique identifier generated in the index range and an instance to which the unique identifier is allocated may be mapped and stored in the identifier management DB 123. The index range received from the identifier allocation server 200 and the last index used for generation of the unique identifier may be stored in the index range management DB 126.

The identifier generation unit 130 generates a unique identifier in the index range allocated by the identifier allocation server 200. Specifically, the identifier generation unit 130 may generate a unique identifier by increasing the index stored in the index range management DB 126 by one and combining the index with a time stamp. In this case, the time stamp is a series of strings indicating a time when the allocation of the unique identifier was requested from the instance. The time stamp may have a format such as Coordinated Universal Time (UTC), but is not limited thereto. Further, the time stamp may be expressed as milliseconds, but is not limited thereto. The identifier generation unit 130 provides the generated unique identifier to the instance which has requested the allocation of the unique identifier. Then, the identifier generation unit 130 may map and store the generated unique identifier and the instance, to which the unique identifier is allocated, in the identifier management DB 123.

The index range management unit 140 manages the index range allocated by the identifier allocation server 200. Specifically, the index range management unit 140 transmits an allocation request for a new index range through the virtual communication unit 110 if the unique identifier allocation request from the instance is a first request, or a unique identifier cannot be generated in the index range stored in the index range management DB 126. The index range management unit 140 receives a new index range through the virtual communication unit 110. Then, the index range management unit 140 may store the new index range in the index range management DB 126.

Further, when transmitting the allocation request for a new index range, the index range management unit 140 may also transmit a desired size for a new index range. In this case, the desired size may be determined on the basis of the time taken until a unique identifier can no longer be generated by using the allocated index range after the index range is allocated by the identifier allocation server 200. Further, the desired size may be determined based on the time interval at which the previous unique identifier is generated by the identifier generation unit 130.

Figure 9:
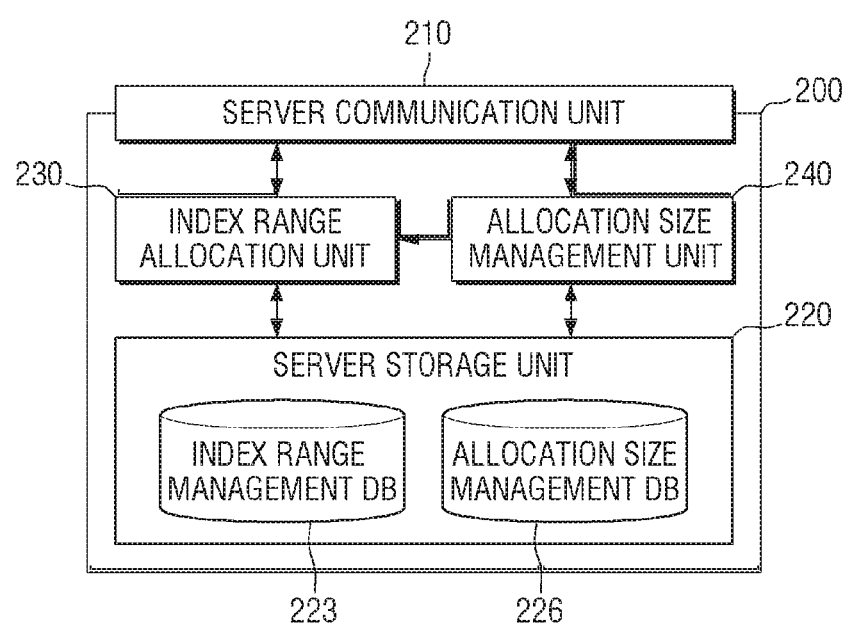
FIG. 9 is a block diagram of an identifier allocation server according to an embodiment of the present invention.

FIG. 9 is a block diagram of the identifier allocation server 200 according to an embodiment of the present invention. Referring to FIG. 9, the identifier allocation server 200 may include a server communication unit 210, a server storage unit 220, an index range allocation unit 230, and an allocation size management unit 240.

Each component will be described in detail. The server communication unit 210 may transmit/receive data to/from one or more virtual machines 100 via a network. Specifically, the server communication unit 210 may receive an allocation request for the index range from the virtual machine 100 via the network. Then, the server communication unit 210 may transmit the index range to the virtual machine 100 via the network.

The server storage unit 220 stores data required for the operation of the identifier allocation server 200. Specifically, the server storage unit 220 may include an index range management DB 223 and an allocation size management DB 226.

The index range management DB 223 may store a list of the index range allocated by the virtual machine 100. Further, the index range management DB 223 may further store the information of the virtual machine 100 to which the index range is allocated, but it is not limited thereto. Further, the allocation size management DB 226 may store the allocation size of the index range. The allocation size management DB 226 may store the allocation size for each virtual machine. Further, if the allocation size is variable, the allocation size management DB 226 may additionally store an accumulated history of the allocation request for the index range.

The index range allocation unit 230 allocates the index range in response to the request of the virtual machine 100. Specifically, the index range allocation unit 230 may allocate the index range according to the allocation size stored in the allocation size management DB 226. Further, when receiving the allocation request for the index range from the virtual machine 100, the index range allocation unit 230 may also receive the desired size for the index range, and allocate the index range according to the received desired size.

The allocation size management unit 240 manages the size of the index range. Specifically, the allocation size management unit 240 may fixedly maintain the size of the allocation range. Further, the allocation size management unit 240 may adjust the allocation size based on the accumulated history stored in the allocation size management DB 226. For example, the allocation size management unit 240 may adjust the allocation size to be relatively large if the time interval of the allocation request for the index range received from the virtual machine 100 becomes shorter, based on the accumulated history. Further, the allocation size management unit 240 may adjust the allocation size to be relatively small if the time interval of the allocation request for the index range received from the virtual machine 100 becomes longer, based on the accumulated history.

The respective components of FIGS. 8 and 9 may refer to software and hardware such as Field-Programmable Gate Arrays (FPGAs) or Application-Specific Integrated Circuits (ASICs). However, the above-described components are not limited to the hardware or software, and may be configured to reside in an addressable storage medium, or may be configured to execute one or more processors. The functions provided within the components may be implemented by more subdivided components, or an aggregation of the components may be implemented as a single component that performs a specific function.

Figure 10:
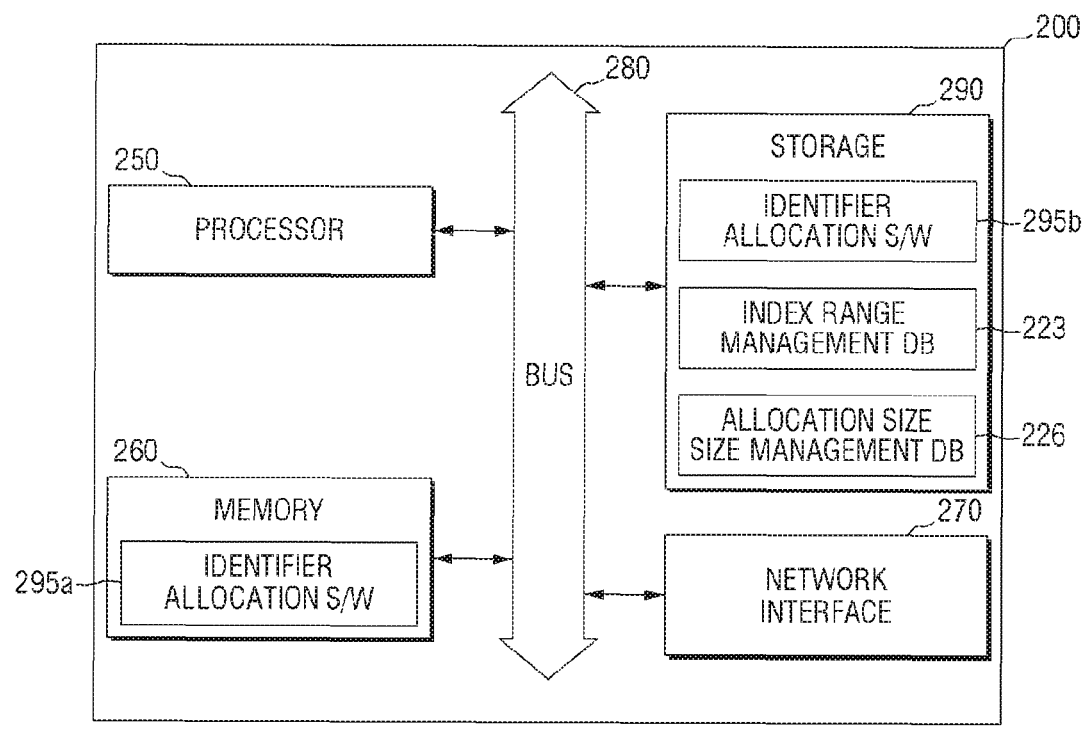
FIG. 10 is a hardware block diagram of an identifier allocation server according to an embodiment of the present invention.

FIG. 10 is a hardware block diagram of the identifier allocation server 200 according to an embodiment of the present invention. Referring to FIG. 10, the identifier allocation server 200 may include a processor 250, a memory 260, a network interface 270, a data bus 280, and a storage 290.

The memory 260 may store computer program data 295a for implementing a method for generating a unique identifier. The network interface 270 may transmit and receive data using a network. The data bus 280 is connected to the processor 250, the memory 260, the network interface 270 and the storage 290 and serves as a path for transferring data between the respective components.

Further, the storage 290 may store an application programming interface (API), a library file, a resource file and the like necessary for executing a computer program. In addition, the storage 290 may store computer program data 295b for implementing a method for generating a unique identifier, the index range management DB 223 and the allocation size management DB 226.

More specifically, the storage 290 may store a computer program including an instruction for receiving an allocation request for an index range for generating a unique identifier from a first virtual machine through the network interface 270, an instruction for allocating a first index range according to a preset first allocation size, an instruction for transmitting the first index range to the first virtual machine through the network interface 270, an instruction for receiving an allocation request for an index range from a second virtual machine through the network interface 270, an instruction for allocating a second index range according to a preset second allocation size, and an instruction for transmitting the second index range to the second virtual machine through the network interface 270.

According to the present invention as described above, by generating a unique identifier autonomously in each of the virtual machines, the instance performed in each virtual machine can allocate a unique identifier faster to the object.

Further, since each virtual machine generates a unique identifier in a range allocated by a single central server, it is possible to ensure uniqueness of the unique identifier in the entire distributed computing environment. In addition, since the central server does not process the allocation requests of all unique identifiers, a bottle-neck does not occur.

Furthermore, since the unique identifier includes a time when the allocation of the unique identifier is requested, it is possible to allocate unique identifiers corresponding to a size of a predetermined range per unit time.

What is claimed is:

1. A method for generating a unique identifier of a distributed computing system consisting of a plurality of virtual machines including a first virtual machine, a second virtual machine and an identifier allocation server, the method comprising:
   receiving, by the first virtual machine, a first index range allocated by the identifier allocation server;
   receiving, by the second virtual machine, a second index range allocated by the identifier allocation server, the second index range being different from the first index range;
   generating, by the first virtual machine, a first unique identifier using an index in the first index range without intervention of the identifier allocation server; and
   generating, by the second virtual machine, a second unique identifier using an index in the second index range without intervention of the identifier allocation server,
   wherein the first unique identifier and the second unique identifier are identifiers satisfying uniqueness for the whole distributed computing system.

2. The method of claim 1, wherein the generating a first unique identifier comprises generating the first unique identifier by combining a time stamp corresponding to a time when allocation of the first unique identifier is requested with an index in the first index range.

3. The method of claim 2, wherein the generating a first unique identifier comprises generating the first unique identifier by increasing an index in the first index range by one and combining the index with the time stamp.

4. The method of claim 1, wherein the generating a first unique identifier comprises transmitting an allocation request for a new index range to the identifier allocation server if the first unique identifier cannot be generated using an index in the first index range.

5. The method of claim 4, wherein the transmitting an allocation request for a new index range comprises transmitting an allocation request for a new index range along with a desired size for the new index range to the identifier allocation server.

6. The method of claim 5, wherein the transmitting an allocation request for a new index range along with a desired size comprises determining the desired size based on a time taken until the first unique identifier can no longer be generated by using an index in the first index range after the first index range is allocated by the identifier allocation server.

7. The method of claim 5, wherein the transmitting an allocation request for a new index range along with a desired size comprises determining the desired size based on a time interval at which a unique identifier is generated before the first unique identifier is generated.

8. The method of claim 1, wherein the receiving a first index range comprises receiving the first index range along with a size for the first index range from the identifier allocation server.

9. The method of claim 8, wherein the size for the first index range is determined by the identifier allocation server based on a time interval at which an index range is allocated for the first virtual machine before the first index range is allocated.

10. A distributed computing system comprising:
one or more computing devices implementing a first virtual machine and a second virtual machine via a hypervisor; and
an identifier allocation server allocating a first index range for the first virtual machine in response to an index range allocation request of the first virtual machine and allocating a second index range for the second virtual machine in response to an index range allocation request of the second virtual machine,
wherein the first virtual machine generates a first unique identifier using an index in the first index range without intervention of the identifier allocation server,
wherein the second virtual machine generates a second unique identifier using an index in the second index range without intervention of the identifier allocation server, and
wherein the first unique identifier and the second unique identifier are identifiers satisfying uniqueness for the whole distributed computing system.

11. A distributed computing system comprising:
one or more computing devices implementing a first virtual machine, a second virtual machine and a third virtual machine via a hypervisor,
wherein the first virtual machine allocates a first index range for the second virtual machine in response to an index range allocation request of the second virtual machine, and allocates a second index range for the third virtual machine in response to an index range allocation request of the third virtual machine,
wherein the second virtual machine generates a first unique identifier using an index in the first index range without intervention of the first virtual machine,
wherein the third virtual machine generates a second unique identifier using an index in the second index range without intervention of the first virtual machine, and
wherein the first unique identifier and the second unique identifier are identifiers satisfying uniqueness for the whole distributed computing system.

* * * * *